United States Patent [19]

Troncoso, Jr.

[11] Patent Number: 4,716,875
[45] Date of Patent: Jan. 5, 1988

[54] SAFETY PLUG DEVICE FOR FUEL LINES

[76] Inventor: Fernando Troncoso, Jr., 14090-6100 Rd., Montrose, Colo. 81401

[21] Appl. No.: 897,267

[22] Filed: Aug. 18, 1986

[51] Int. Cl.$^4$ ............................................. F02M 55/02
[52] U.S. Cl. ..................................... 123/469; 138/89; 123/198 B
[58] Field of Search ................. 123/198 D, 468, 469; 403/265, 360, 361, 375; 138/89

[56] References Cited

U.S. PATENT DOCUMENTS

| 3,804,126 | 4/1974 | Haferer | 138/89 |
| 4,327,690 | 4/1982 | Sauer et al. | 123/198 D |
| 4,601,275 | 7/1986 | Weinand | 123/468 |

Primary Examiner—Craig R. Feinberg
Assistant Examiner—M. Macy
Attorney, Agent, or Firm—Donald E. Nist

[57] ABSTRACT

The safety plug device is adapted to releasably plug the fluid fuel line of an internal combustion engine. The device has an external multiple stepped cylindrical configuration and/or central cavity with a like configuration so that it can be used effectively with various diameters of fuel lines and can either be inserted in the central opening of the fuel line or can be disposed over the fuel line, to prevent loss of fuel after the fuel line is removed from, for example, a carburetor. The device is preferably of resilient elastomeric material resistant to deterioration by fuel and can include metal inserts, or be all metal, ceramic, etc. Thus, danger of fire from spilled fuel such as gasoline, kerosene, oil and the like can be readily avoided by the use of the plug device. Moreover, because the plug device physically reinforces the fuel line, clamping of the fuel line at the plug device does not damage the fuel line, in contrast to conventional clamping which breaks down the fuel line. In one embodiment, the plug device includes an outer protective resilient sheath which enables clamps of a single diameter to be effectively used. The device is simple, durable and inexpensive.

3 Claims, 6 Drawing Figures

SAFETY PLUG DEVICE FOR FUEL LINES

BACKGROUND OF THE INVENTION

1. Field of the Invention

The present invention generally relates to safety devices and more particularly to a safety plug device for a fuel line for an internal combustion engine for a marine, aircraft or land vehicle or a stationary engine.

2. Prior Art

Fluid fuel lines for internal combustion engines normally are flexible, being fabricated of rubberized fabric or the like, or are rigid metal lines. They run between the gasoline or diesel oil tank and/or other components, for example, the carburetor, filter, etc. Such fuel lines are normally releasably clamped securely over projecting metal nozzles, entry and exit ports and the like of the above-described components.

When it is needed to remove the fuel line from the component to which it is connected, for example, to detach it from the carburetor in order to repair the carburetor, the fuel line is unclamped therefrom. However, the fuel line is normally full of highly dangerous, noxious flammable fuel which readily runs out of the fuel line on or near the hot engine and other parts unless the fuel line is quickly reclamped shut. Reclamping the fuel line, however, has a pronounced tendency to break it down, causing cracks to appear in its sidewall and eventually leading to its failure. This is because the free end of the fuel line during such clamping is not physically supported by an internally placed metal nozzle, port fitting or the like, as it is when it is attached to the carburetor, nozzle, etc., but instead, must be mashed completely flat in order to stop the flow of fuel therefrom.

Accordingly, there is a need for an improved device to prevent loss of fuel from disconnected fuel lines. The device should be simple, inexpensive, durable and efficient, easy to install and remove and usable with fuel lines of various diameters. Moreover, such device should be usable without in any way impairing the physical integrity of the fuel line. The device should also be capable of being provided in a variety of configurations to satisfy various fuel line applications.

SUMMARY OF THE INVENTION

The improved safety plug device of the present invention satisfies all the foregoing needs. The device is substantially as set forth in the Abstract. In this regard, the device comprises a solid plug body with a fuel line-blocking plug portion and a multiple stepped outer and/or inner configuration to accommodate fuel lines of various external and internal diameters. The device also includes means for releasably securing the plug body to the fuel line. Such means may include a separate ring clamp, butterfly spring clamp or the like and/or may involve a particular sloped step configuration and/or ribbed or roughened step configuration to enable the plug body to tightly releasably grip the fuel line.

In one embodiment, the plug body comprises a series of cylinders of decreasing diameter connected end-to-end to form the externally stepped configuration. The small end of the plug body is closed while the opposite end is open, having a central longitudinal cavity with a cylindrical multi-stepped configuration matching the external multi-stepped configuration. In another embodiment, the external multi-stepped configuration is disposed in a first portion on one end of the plug body and the internal multi-stepped configuration is disposed in a second portion on the opposite end of the plug body, the two portions being disconnectable.

The plug which has an externally stepped outer configuration may also have a uniform diameter, resilient, flexible cylindrical sheath spaced outwardly therefrom and connected thereto with an open end at the smallest diameter end of the plug body. The sheath can be split longitudinally to releasably grip and thus accommodate various diameters of fuel lines, preventing leakage therefrom.

The plug body and sheath can be of flexible synthetic or natural rubber or plastic or the like which is resistant to fluid fuel. If desired, the plug body can be reinforced with metal, ceramic, stiff plastic or the like or formed entirely thereof. The device also contemplates the use of a ring clamp or spring clamp which may already be present as a clamp for the fuel line. Further features of the present invention are set forth in the following detailed description and accompanying drawings.

DRAWINGS

DETAILED DESCRIPTION

FIG. 1

Figure 1:
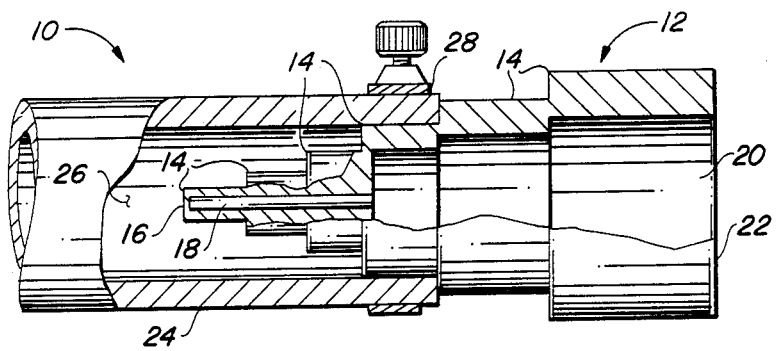
FIG. 1 is a schematic side elevation, partly broken away and partly in section, illustrating a first preferred embodiment of the improved safety plug device of the present invention, showing the device releasably secured to a fuel line.

Now referring more particularly to FIG. 1, a first preferred embodiment of the improved safety plug device of the present invention is schematically depicted therein. Thus, device 10 is shown which comprises a flexible resilient solid plug body 12. Body 12 may be of any elastomeric material such as synthetic plastic or rubber or natural rubber or the like which is resistant to deterioration by the fuel expected to be encountered. Body 12 includes a plurality of various diameter cylinders 14 integrally connected end-to-end in an array of decreasing diameters to form a unitary structure with an external multi-stepped configuration. The smallest diameter end 16 of body 12 is solid and closed, with an internal longitudinally extending metal reinforcing rod 18 embedded therein. Rod 18 extends through the three smallest cylinders 14, which are solid. The next three cylinders 14 are hollow, having a central cavity 20 which extends therethrough to an open end 22 of plug body 12. Cavity 20 is configured to provide plug body 12 with a three-stepped internal configuration paralleling the stepped external configuration of the largest cylinders.

As shown in FIG. 1 a cylindrical flexible fluid fuel line 24 for a vehicle and having a central cylindrical fuel passageway 26 therein can be releasably secured over the smallest four outer steps of plug body 12 and can be releasably clamped in place with conventional ring clamp 28 which comprises the securing means of device 10. If line 24 were of sufficiently small diameter, it could, instead, be inserted in cavity 20 until it abutted an internal step thereof and then could be clamped in place by clamp 28, or the like.

Device 10 is simple, inexpensive, compact, durable, easy to use and efficient. It quickly blocks the flow of fuel from line 24 without damaging line 24. Clamping line 24 with clamp 28 does not hurt line 24 since line 24 is internally supported by plug body 12. Accordingly, device 10 is safe and convenient to use.

FIG. 2

Figure 2:
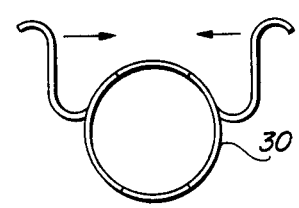
FIG. 2 is a schematic front elevation of a butterfly spring clamp usable in the present plug device of FIG. 1.

A conventional butterfly clamp 30 usable in place of or in addition to clamp 28 is schematically depicted in FIG. 2.

FIGS. 3, 4, 5 and 6

A second preferred embodiment of the improved safety plug device of the invention is schematically depicted in FIG. 2. Third, fourth and fifth preferred embodiments are depicted in, respectively, FIGS. 4, 5 and 6. Components similar to those of FIG. 1 bear the same numerals but are succeeded by the letter "a" in FIG. 3, the letter "b" in FIG. 4, the letter "c" in FIG. 5 and the letter "d" in FIG. 6.

FIG. 3

Figure 3:
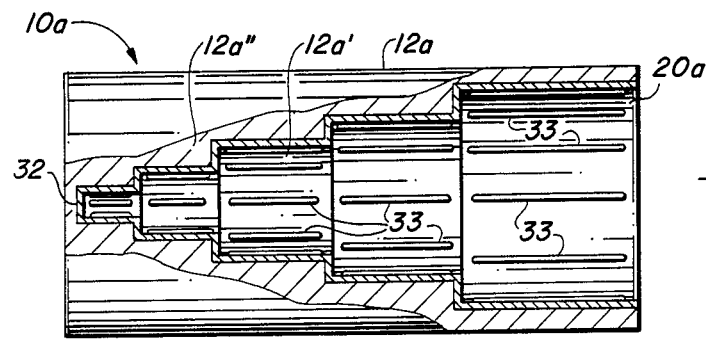
FIG. 3 is a schematic side elevation, partly broken away and partly in section, of a second preferred embodiment of the improved plug device.

In FIG. 3, device 10 is shown which is similar to device 10, except that plug body 12a comprises an external multiple stepped portion 12a' which is releasably enclosed in an internal multiple stepped portion 12a". Cavity 20a extends almost all the way through portion 12a" to a closed partition 32. Plug body portion 12a' is solid, rigid metal or the like with external fuel line-gripping ribs 33, while portion 12a" is resilient flexible material which fully encases portion 12a' for easy storage until it is ready for use. A clamp such as clamp 28 or 30 can be used with portions 12a' and 12a" to obtain the advantages for device 10a of device 10.

FIG. 4

Figure 4:
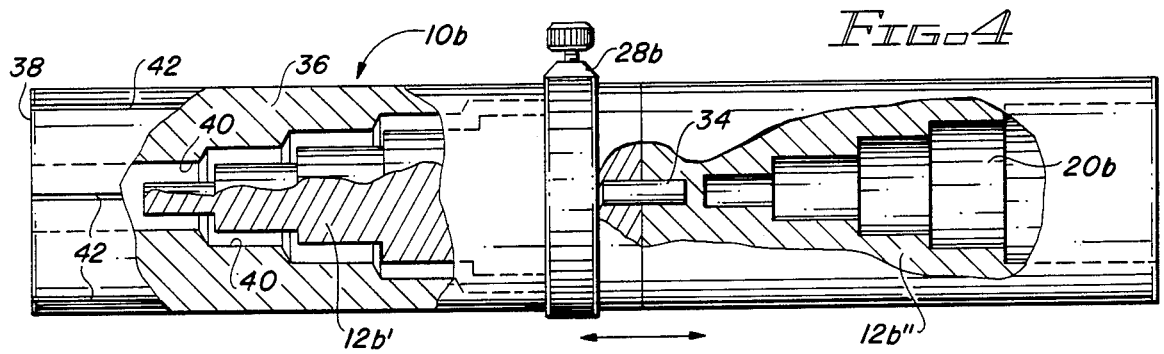
FIG. 4 is a schematic side elevation, partly broken away and partly in section, of a third preferred embodiment of the improved plug device of the present invention.
Figure 5:
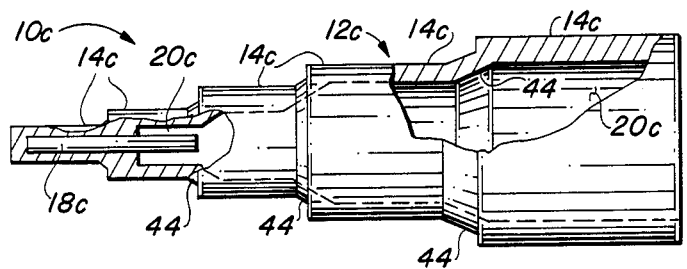
FIG. 5 is a schematic side elevation, partly broken away and partly in section, of a fourth preferred embodiment of the improved plug device of the present invention; and, FIG. 6 is a schematic side elevation, partly broken away, of a fifth preferred embodiment of the improved plug device of the present invention.
Figure 6:
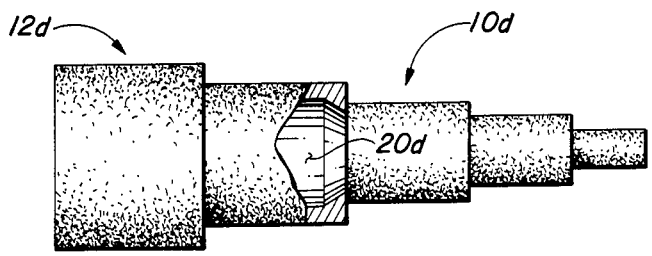

Device 10b of FIG. 4 is similar to device 10a with portions 12b' and 12b" releasably joined together back-to-back by an internal pin 34. Moreover, device 10b includes a cylindrical flexible resilient outer sheath 36 spaced outwardly from portion 12b', extending longitudinally therewith, joined to portion 12b' adjacent portion 12b" and including an open end 38 adjacent the smallest of cylinders 14b. In addition, the internal surface 40 of sheath is stepped to parallel the steps of cylinders 14b of portion 12b', and sheath 36 also includes spaced parallel longitudinal slits 42 to permit it to flex open to receive a fuel line (not shown), then grip it tightly to prevent fuel leakage. Ring clamp 28a may be used to secure such a fuel line (not shown) in place against portion 12b' or 12b" for the advantages of devices 10 and 10a.

FIG. 5

Device 10c is substantially identical to device 10 except that sloped portions 44 are provided between the various steps in the multiple stepped external and internal configuration thereof in order to releasably and firmly anchor a fuel line to plug body 12c without the necessity of clamps. In addition, rod 18c is secured in the cylinder 14c of smallest diameter only (which is filled in) and extends into cavity 20c of the next larger diameter cylinder 14c. Device 10c could also use clamp 28 or 30 or a similar clamp, if desired.

FIG. 6

Device 10d is substantially identical to device 10 except that the outer surfaces of plug body 12d and the internal surfaces thereof defining cavity 20d are roughened and irregular to facilitate gripping of fuel line 24 or the like without necessitating the use of a clamp such as 28 or 30.

Devices 10, 10a, 10c and 10d perform efficiently on internal combustion engine fuel lines which are flexible and can also be used on rigid fuel lines.

Various modifications, changes, alterations and additions can be made in the improved safety plug device of the present invention, its components and parameters. All such modifications, changes, alterations and additions as are within the scope of the appended claims form part of the present invention.

What is claimed is:

1. An improved safety plug device for internal combustion engine fluid fuel lines, said device comprising, in combination:
   a. a plug body kit having separate and independent first and second fuel line plugging portions, said first portion comprising a solid core having means for plugging insertion into fuel lines of various internal bore diameters comprising a multiple stepped outer surface, said second portion comprising an outer sheath with a central cavity in which said core is stored and releasably removed therefrom, said cavity being defined by multi-stepped inner surfaces of said sheath mating with said multiple stepped outer surface of said core, said sheath having an open end and a closed end and having means to internally receive and plug fuel lines of various outer diameters in said cavity through said open end by virtue of said multi-stepped inner surfaces when said core is out of said sheath.

2. The improved safety device of claim 1 wherein said second portion of said plug body has a longitudinally extending central cavity reaching from an open end of said second portion of said plug body part way through a length of said second portion plug body towards a closed opposite end thereof and wherein said central cavity comprises a plurality of longitudinally extending cylindrical portions of progressively decreasing diameters connected end-to-end, with said largest diameter portion at said open end, to provide said second portion of said plug body with an internal, multiple stepped configuration.

3. The improved safety device of claim 2 wherein said first portion of said plug body also includes a plurality of longitudinally extending external cylindrical portions of progressively increasing diameters connected end-to-end beginning at one end to provide said first portion of said plug body with an external multiple stepped configuration.

* * * * *